Feb. 26, 1946.  P. RENFREW ET AL  2,395,795
SLOW CLOSING VALVE CONTROL FOR PREDETERMINING COUNTERS
Filed Feb. 10, 1943  3 Sheets-Sheet 1
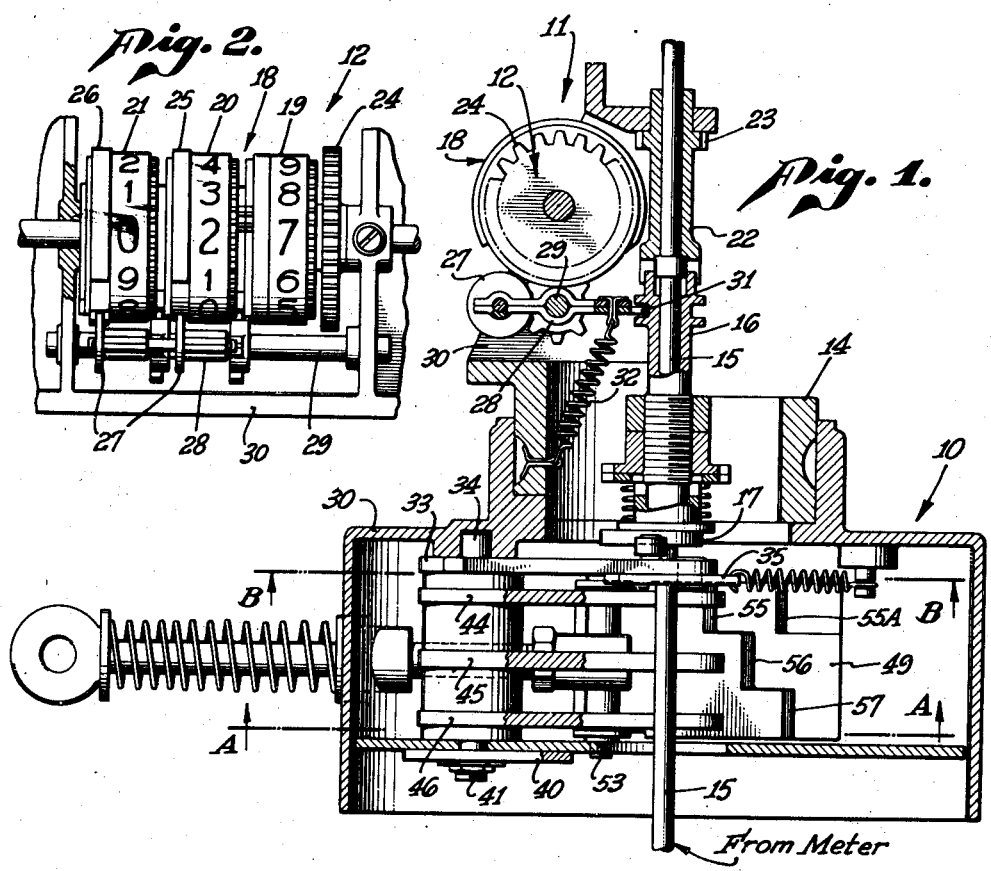
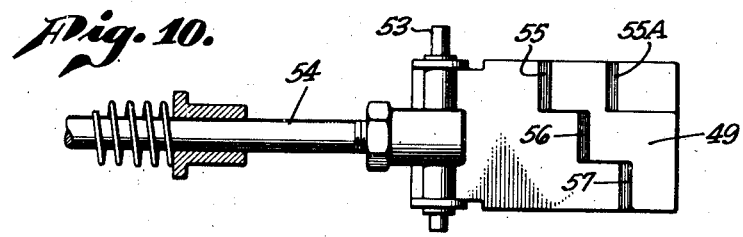
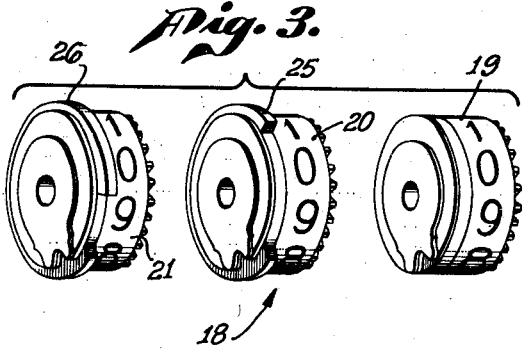
PAUL RENFREW,
WILLIAM F. BERCK,
INVENTOR.
BY Oscar A. Mellin
ATTORNEY.

Feb. 26, 1946.   P. RENFREW ET AL   2,395,795
SLOW CLOSING VALVE CONTROL FOR PREDETERMINING COUNTERS
Filed Feb. 10, 1943   3 Sheets-Sheet 2
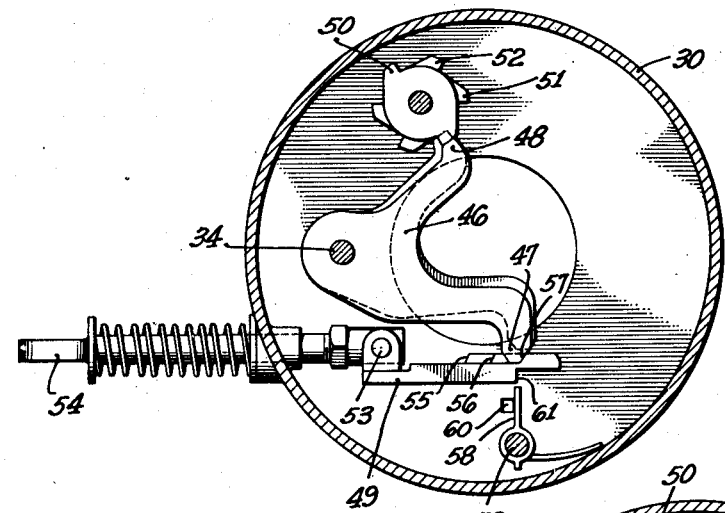
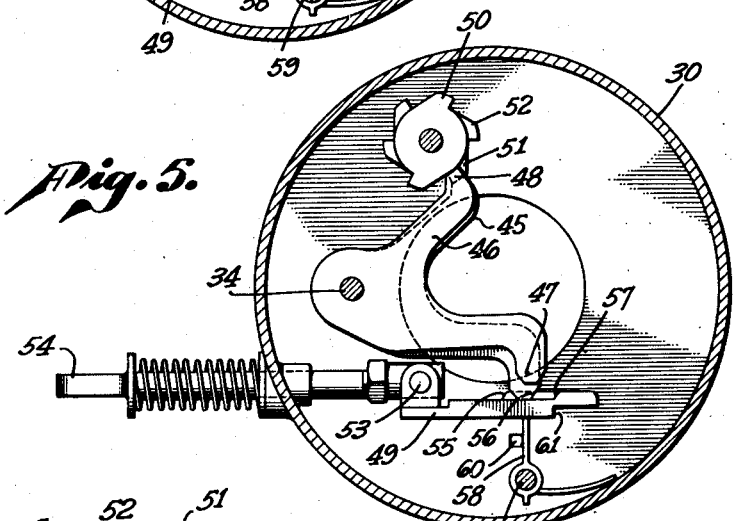
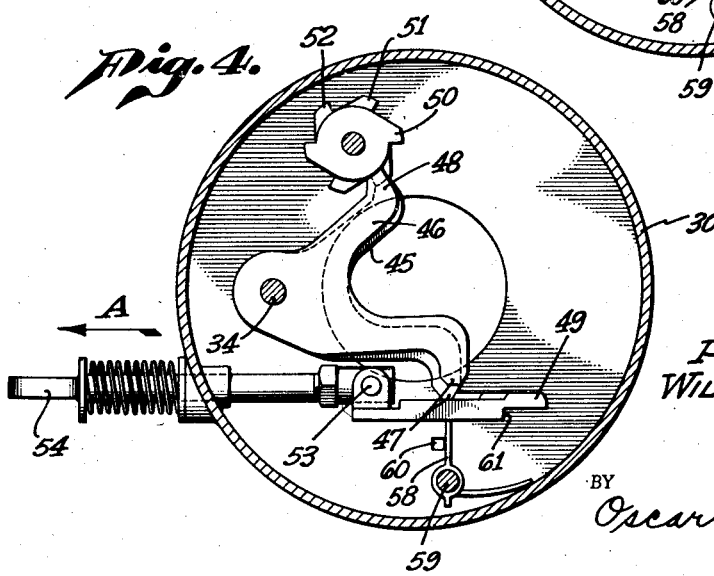
PAUL RENFREW,
WILLIAM F. BERCK,
INVENTOR.
BY Oscar A. Mellin
ATTORNEY.

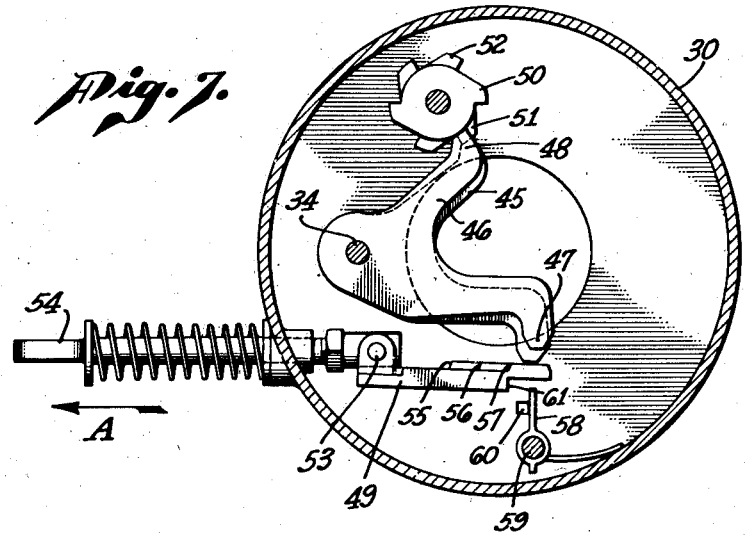
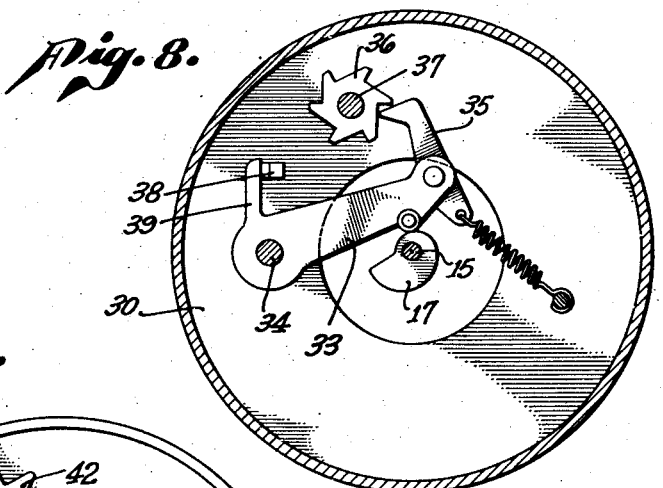
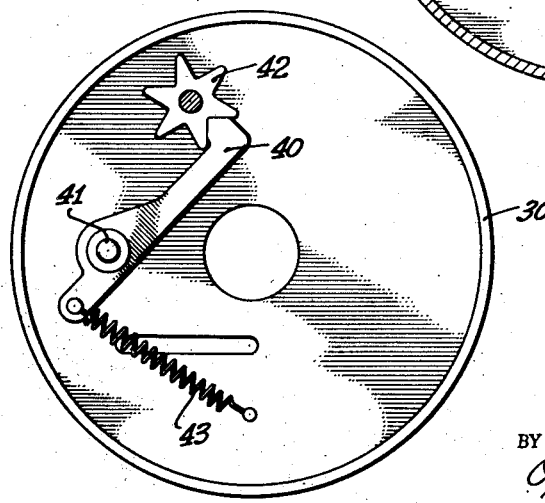

Patented Feb. 26, 1946

2,395,795

UNITED STATES PATENT OFFICE 2,395,795

SLOW CLOSING VALVE CONTROL FOR PREDETERMINING COUNTERS

Paul Renfrew, Berkeley, and William F. Berck, Hayward, Calif., assignors to Ralph N. Brodie Company, Oakland, Calif., a corporation of California Application February 10, 1943, Serial No. 475,398

4 Claims. (Cl. 235—132)

This invention relates to shut-off devices for liquid meters and particularly pertains to an apparatus for use in connection with liquid meters which may be preset and which will operate to discontinue the meter operation automatically in step by step fashion when the volume of liquid predetermined by the setting of the apparatus has been delivered by the meter.

It is the principal object of the present invention to provide a generally improved and simplified apparatus of the character referred to which will operate efficiently, accurately and positively under all conditions of meter operation.

One form which the invention may assume is exemplified in the following description and illustrated by way of example in the accompanying drawings, in which:

Fig. 1 is a fragmentary view in central vertical section through a fluid meter and a counting mechanism therefor disclosing our improved mechanism associated therewith.

Fig. 2 is a fragmentary view in section taken at right angles to Fig. 1 and disclosing the counter mechanism.

Fig. 3 is a perspective view showing the trip wheels on the counter wheels.

Figs. 4, 5, 6 and 7 are views in transverse section taken on line A—A of Fig. 1, showing the different positions which the tripping mechanisms assume during the tripping operations.

Fig. 8 is a fragmentary view in transverse section taken on line B—B of Fig. 1.

Fig. 9 is a bottom view.

Fig. 10 is a face view of the trip plate.

Referring more particularly to the accompanying drawings, 10 indicates a fluid meter and 11 the counter thereof. Included in the counter is an automatic predetermining counter mechanism 12 which is installed in the hollow base 14 of the counter. The predetermining counter mechanism 12 is of the type which automatically releases the shut-off valve in the delivery line from the meter after a predetermined volume of fluid passes through the meter. Also, the predetermining counter mechanism has the characteristic of causing the shut-off valve to close progressively step by step as the shut-off point is reached so as to prevent undue shock and strain in the meter lines, such as would be caused by instant closing of the shut-off valve.

In the present instance the shut-off valve is closed progressively step by step commencing when all but twenty gallons of the amount determined by the setting of the predetermining counter mechanism has been delivered. At this point the shut-off valve is permitted to partially close. When ten gallons are left to be delivered, a further step of closure of the shut-off valve occurs and the valve is finally permitted to finally close when the entire amount of the fluid determined by the setting of the counter wheels of the predetermining counter mechanism has been delivered from the meter.

In the mechanism disclosed there are but three shut-off steps which occur ten gallons apart. However, the increments of shut-off and the number thereof may be such as desired without departing from the present invention as will be obvious from an understanding of the apparatus herein disclosed.

The predetermining counter mechanism is driven from a counter drive shaft 15 which in turn is driven by the meter at the rate of one revolution for each ten gallons delivered by the meter. Mounted for reciprocation on the drive shaft is a sleeve 16 which is splined to the counter drive shaft 15 so that it will revolve therewith, but which is permitted a limited amount of vertical reciprocation on the shaft 15. At the lower end of this sleeve is a trip cam 17.

The counter mechanism also includes a set of predetermining counter wheels 18, in this instance there being three wheels; that is to say, a units wheel 19, a tens wheel 20 and a hundreds wheel 21, which are connected together by transfer mechanism of a type such as shown in Letters Patent of the United States No. 2,082,375, dated June 1, 1937. These counter wheels of the predetermining counter 12 may be independently set for predetermining the amount of liquid to be discharged through the meter before the shut-off valve is closed, in a manner such as illustrated and described in the aforesaid Letters Patent of the United States.

Inasmuch as the transfer mechanism between the counter wheels and the mechanism for setting the wheel constitutes no part of our present invention, it is not here illustrated. Although for this purpose we prefer to employ the type of mechanism shown in the aforesaid patent, any other mechanism capable of accomplishing the same purposes may be employed.

We desire to point out that when setting the predetermining counter wheels 18, the same are retrograded from zero so that the display numerals thereon will indicate the volume of liquid it is desired to have pass through the meter before the tripping of the shut-off valve is effected. After setting and when the shut-off valve is open and the meter commences operating, the wheels will be driven in the same direction by the meter until the zero position of all the wheels is reached.

The driving of the predetermining counter wheels 18 is effected from the counter drive shaft 15 through the sleeve 22 which is fixed thereon and thence through a gear train 23 to a gear 24 on the units wheel, the driving connection between the gear 24 and said units wheel being a one to one ratio.

It will be noticed that the tens wheel and the hundreds wheel are each provided with a fixed trip wheel 25 and 26, each of which is formed with a recess in its periphery as illustrated in the drawings. The recess in the trip wheel 25 associated with the tens wheel is in alignment with three stations on the tens wheel. On the trip wheel 26 associated with the hundreds wheel the recess is aligned with one station only.

When the predetermining counter is in position to institute the start of the cycle for tripping the valve the first step, the hundreds wheel will be at zero position and the tens wheel will be in the "2" position; that is, three revolutions of the units wheel from zero position. At this time the recesses of these two wheels will be in alignment and in register with rollers 27 rotatably mounted in alignment on the free end of a wide fulcrum lever 28 pivoted intermediate its ends as at 29 to the counter frame 30. The other free end of this fulcrum lever is provided with a bifurcated portion collared as at 31 to the sleeve 16. In that the roller end of the fulcrum lever will be free to move upwardly into the recesses in the trip wheels 25 and 26, at this time a spring 32 will move the bifurcated end of the fulcrum lever downwardly, imparting a downward movement to the sleeve 16 which conditions the tripping mechanism for tripping the shut-off valve for its first closing step when the tens wheel advances from the third station to its second station.

The first operation of this conditioning of the trip mechanism is, of course, the lowering of the cam 17 into operating position with respect to an actuating lever 33 pivoted at one end on a shaft 34 fixed in the frame 30. At its free end the actuating lever 33 carries a pawl 35 which cooperates with a ratchet gear 36 fixed on a shaft 37 rotatably mounted in the frame. A stop member 38 is provided on the frame to be engaged by a stop arm 39 on the lever 33 to limit the movement of the lever 33 toward the axis of the cam 17. Obviously, when the cam revolves one complete revolution, the lever will be moved radially outward with respect to the axis of the cam 17 and the pawl 35 thereon will actuate the ratchet gear 36 to revolve it one-sixth of a revolution in an anti-clockwise direction. The return movement of the lever 33 will, of course, not affect the ratchet wheel 36, and for the purpose of holding this ratchet wheel 36 in the position to which it is advanced by operation of the pawl 35, there is provided a latch lever 40 pivoted to the frame as at 41 and which has a detent end engaging a star wheel 42 also fixed on the shaft 37. The detent end of the lever 40 is yieldingly urged into the recesses in the star wheel 42 by a spring 43. When the pawl 35 advances the ratchet gear 36, the star wheel, of course, will move one-sixth of a revolution, automatically disengaging from the detent end of the lever 40 but permitting the latter to engage in the next recess to yieldingly hold the shaft 37 and the gear 36 in the position to which it is advanced or rotated by actuation of the actuating lever 33.

Freely mounted for pivotal movement on the shaft 34, which is a fixed shaft, are three trip levers 44, 45 and 46, one trip lever being provided for each step of closing of the shut-off valve. These levers are somewhat in the shape of a bell crank and each has two cam ends 47 and 48. The ends 47 of the levers are to engage a trigger plate 49, while the ends 48 are to engage positioning cams 50, 51 and 52, there being one positioning cam for each trip lever. The trip plate 49 is hinged as at 53 to a valve connecting rod 54 which is connected through an intermediate mechanism to the shut-off valve, preferably of a type wherein a strong spring continuously urges the valve member to seating position so that the spring force of the valve, when it is open, is constantly tending to move the connecting rod 54 in the direction of the arrow "A" in Fig. 7.

The valve plate 49 has formed on its surface three abutments 55, 56 and 57, one being in alignment with each trip lever and being progressively offset with respect to each other an equal amount in a horizontal plane. The trip plate 49 moves endwise between the ends 47 of the trip levers and a pivoted guide member 58 pivoted to the frame as at 59. When the connecting rod and the trip plate 49 move in the direction of the arrow "A" in Fig. 4, this trip plate maintains a fixed relationship between the ends 47 of the trip levers and the guide member 58 so that the abutments will engage the ends 47 of the trip levers, or the end of such trip lever as may be in position, as will be described. However, when the valve is fully closed and the connecting rod 54 is moved in a direction opposite to that of the arrow "A" in Fig. 7, for the purpose of opening the valve and conditioning the mechanism for a subsequent operation, the pivoted guide member 58 permits the guide plate 49 to move in a direction away from the ends 47 of the levers so that the abutments 55, 56 and 57 may ride over the ends 47 of the trip levers so that the plate may be positioned for the subsequent operation. The pivoted guide member 58 so operates because of the provision of a stop member 60 on the frame, as illustrated.

The trip levers 44, 45 and 46 are progressively positioned to engage their respective abutments 55, 56 and 57 by means of the positioning cams 50, 51 and 52. That is to say, when the valve is fully opened, the mechanism is so conditioned that one of the high points on the cam 52 will engage the end 48 of the trip lever 44 and maintain it positioned to engage the abutment 55 of the trip plate 49, thus preventing movement of the connecting rod 54 in the direction of the arrow "A" in Fig. 4 or in the valve closing direction. When the cam 17 makes a complete revolution to actuate the actuator lever 33, upon the hundreds wheel reaching zero station and during the time the tens wheel moves from "2" to "1" station, one of the high points of the cam 51 will position the trip lever 45 to engage the abutment 56 of the hinge plate 49, while the high point of the cam 52 will release the trip lever 44 so as to permit movement in the valve closing direction of the connecting rod 54 and the trip plate 49 until the abutment 56 engages the end 47 of the lever 45.

The formation of the abutments 55, 56 and 57 and the ends 47 of the tripping levers 44, 45 and 46 causes a camming action to result when the high points of the cams 50, 51 and 52 release the tripping levers so as to disengage the ends 47 with the abutments on the plate 49.

While the cam 17 makes another complete revolution and during the travel of the tens wheel from the "1" to the "0" position, the positioning cam 50 positions the tripping lever 46 in position to engage the abutment 57 and the cam 51 releases the tripping lever 45 for the second valve closing step. After the tens wheel reaches "0" position the cam 17 and the units wheel make another complete revolution. At the same time the cam 50 will release the lever 46 to release the trip plate 49 entirely and permit the valve to entirely close. Also at the same time one of the high points of cam 52 will reengage end 48 of trip lever 44. However, end 47 of trip lever 44 will drop into recess 55a on trip plate 49 and will not block the movement of trip plate 49 in the valve closing direction.

Upon subsequent opening of the valve, the latch plate will move in the direction opposite that of arrow "A" in Fig. 7 a distance so that the abutment 55 will travel beyond the interposed and positioned end 47 of the lever 44. Simultaneously the stop 61 in trip plate 49 will strike pivoted guide 58 causing it to pivot about bearing 59 against spring pressure thus allowing blocking point 55 on trip plate 49 to move past point 47 on trip lever 44. As soon as the blocking point 55 has passed the point 47, spring pressure on pivoted guide 58 causes it to return to its normal position against stop 60 thus maintaining the guided travel of trip plate 49 in a fixed plane. When the valve tends to close, the abutment 55 will engage the end 47 of the lever 44 and be held in open position for a second cycle of operation. It is obvious that the mechanism will operate in identical fashion after each valve opening.

In summary, it should be said that the cam 17 makes one complete revolution for each ten gallons of fluid delivered through the meter, and that during each complete revolution after that the hundreds wheel arrives at zero station and the tens wheel arrives at the "2" station, a step of value closing will be effected. That is, a step of closing will be effected when the tens wheel is at the "1" station. A step of closing will be effected when the tens wheel is at the "0" station, and a complete and last step of closing when the units wheel reaches the zero station. It is also obvious that upon complete valve closing, the trip levers are conditioned to recommence their cycle of operation immediately that the valve is reopened.

In operation of the device, the operator sets the dial wheels of the predetermining counter mechanism to the selected amount and then opens the valve which is connected to the connecting rod 54 so that the latter moves in a direction opposite that indicated by the arrow "A" in Fig. 7. During this movement, the trip plate 49 can ride over the positioned end of the trip lever 44 due to the hinged mounting of the guide 58. When the valve lever is released, the spring tension against the valve tending to close it causes the abutment 55 to engage the end 47 of the trip lever 44 and maintains the valve fully opened. Immediately the meter commences operating and commences driving the counter wheels toward zero. When the hundreds wheel reaches zero, the recess in its trip wheel will register with the roller on the fulcrum lever 28, and when the tens wheel reaches the "2" station, the recess in its trip wheel will likewise register with the roller on the fulcrum lever 28, allowing the inner end of the fulcrum lever to be pulled down by the spring 32, placing the cam 17 in alignment with the cam roller on the actuator lever 33. As this cam makes one complete revolution during the delivery of each ten gallons or the movement of between one station to the succeeding one of the tens wheel, it will actuate the actuator lever 33 through one complete cycle of operation during each complete revolution of the cam 17. This, as previously described, successively places the trip levers 44, 45 and 46 in engagement with the abutments 55, 56 and 57 and releases them from such engagement so as to cause the valve to close one step during each ten gallons of delivery through the meter, the last step enabling the valve to completely close.

It is obvious from the foregoing that any number of steps may be provided by simply multiplying the numbers of trip levers, positioning cams and abutments, and by correspondingly changing the recesses in the trip wheels of the dial wheels. We have shown three trip levers here with their cooperating elements for the purpose of simplicity, but it is obvious that they can be multiplied to any extent desired to permit any number of steps of closing of the valve as may be deemed necessary or desirable.

While we have shown the preferred form of our invention, it is to be understood that various changes may be made in its construction by those skilled in the art without departing from the spirit of the invention as defined in the appended claims.

We claim:

1. In an apparatus of the character described, a plurality of revoluble members, a longitudinally movable trip plate having a plurality of stops arranged progressively offset longitudinally of the trip plate, a pivotal trip lever for each stop, a cam for each trip lever, said cams being relatively fixed together and timed to successively position the trip levers to engage their respective stops and release the trip lever preceding the one so positioned whereby it will be cammed from its stop by the movement of the trip plate in engaging the successive trip lever by its trip plate stop, said cams operating intermittently to position one trip lever to engage its stop and release the trip lever preceding the one so positioned whereby it will be cammed from its stop by the movement of the trip plate in engaging the successive trip lever by its trip plate stop during each step of operation, and means for intermittently operating said cams in synchronism with the operation of the revoluble members whereby the apparatus will release the trip plate step by step when said revoluble members are in definite predetermined positions in their cycle of operation.

2. In an apparatus of the character described, a plurality of revoluble members, a longitudinally movable trip plate having a plurality of stops arranged progressively offset longitudinally of the trip plate, a pivotal trip lever for each stop, a cam for each trip lever, said cams being relatively fixed together and timed to successively position the trip levers to engage their respective stops and release the trip lever preceding the one so positioned whereby it will be cammed from its stop by the movement of the trip plate in engaging the successive trip lever by its trip plate stop, said cams operating intermittently to position one trip lever to engage its stop and release the trip lever preceding the one so positioned whereby it will be cammed from its stop by the movement of the trip plate in engaging the successive trip lever by its trip plate stop during each step of operation, a driven rotatable member normally ineffective to operate said cams, operating means between the revoluble members and said rotatable member adapted to render the rotatable member effective to operate said cams after a predetermined amount of operation of the revoluble members, and an operative connection between said rotatable member and said cams operative when said rotatable member is in effective position to intermittently operate said cams in synchronism with the operation of the revoluble members whereby the apparatus will release the trip plate step by step when said revoluble members are in definite predetermined positions in their cycle of operation.

3. In an apparatus of the character described, a plurality of revoluble members, a longitudinally movable trip plate having a plurality of stops formed thereon and arranged progressively offset both longitudinally and laterally of the trip plate, a pivotal trip lever for each stop, said trip levers being pivoted about a common axis, a cam for each trip lever, said cams being relatively fixed together and relatively timed to successively position the trip levers to engage their stops and to release the trip lever preceding the one positioned to engage its stop whereby it will be cammed from its stop by the movement of the trip plate in engaging the successive trip lever by its trip plate stop, said cams operating intermittently and capable of positioning one trip lever to engage its stop and release the preceding trip lever whereby it will be cammed from its stop by the movement of the trip plate in engaging the successive trip lever by its trip plate stop during each step of operation, and an operating connection between said cams and said revoluble members for intermittently operating said cams in synchronism with the operation of the revoluble members whereby the apparatus will release the trip plate step by step when said revoluble members are in definite predetermined positions in their cycle of operation.

4. In an apparatus of the character described, a plurality of revoluble members, a longitudinally movable trip plate having a plurality of stops formed thereon and arranged progressively offset both longitudinally and laterally of the trip plate, a pivotal trip lever for each stop, said trip levers being pivoted about a common axis, a cam for each trip lever, said cams being relatively fixed together and relatively timed to successively position the trip levers to engage their stops and to release the trip lever preceding the one positioned to engage its stop whereby it will be cammed from its stop by the movement of the trip plate in engaging the successive trip lever by its trip plate stop, said cams operating intermittently and capable of positioning one trip lever to engage its stop and release the preceding trip lever whereby it will be cammed from its stop by the movement of the trip plate in engaging the successive trip lever by its trip plate stop during each step of operation, operating means for intermittently operating said cams, a driven rotary member normally out of driving relationship with said means but capable of operating the same when placed in driving relationship thereto, said driven rotary member being operated in synchronism with the revoluble members and adapted to be automatically placed in operative relation to said means upon a predetermined amount of operation of the revoluble members and to continue in operative relation thereto whereby it will release the trip plate step by step when the revoluble members are in definite predetermined positions in their cycle of operation.

PAUL RENFREW.
WILLIAM F. BERCK.